(12) United States Patent
Damiani et al.

(10) Patent No.: US 9,981,660 B2
(45) Date of Patent: May 29, 2018

(54) OPERATION OF A VEHICLE BY CLASSIFYING A PRECEDING VEHICLE LANE

(71) Applicant: Nissan North America, Inc., Franklin, TN (US)

(72) Inventors: Andrew Damiani, Eastpointe, MI (US); Roy Goudy, Farmington Hills, MI (US); Neal Probert, Framington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 150 days.

(21) Appl. No.: 15/251,623

(22) Filed: Aug. 30, 2016

(65) Prior Publication Data

US 2018/0056999 A1    Mar. 1, 2018

(51) Int. Cl.
*B60W 30/16* (2012.01)
*G01S 13/93* (2006.01)

(52) U.S. Cl.
CPC ......... *B60W 30/16* (2013.01); *B60W 2420/52* (2013.01); *B60W 2550/308* (2013.01); *B60W 2750/306* (2013.01); *G01S 2013/9321* (2013.01)

(58) Field of Classification Search
CPC .............. B60W 30/16; B60W 30/165; B60W 30/0956; B60W 30/14; B60W 2420/52;
(Continued)

(56) References Cited

U.S. PATENT DOCUMENTS 5,939,976 A    8/1999  Sasaki et al.
5,940,010 A    8/1999  Sasaki et al.
(Continued)

FOREIGN PATENT DOCUMENTS

JP    2001-118199 A    4/2001
JP    2003-051099 A    2/2003

OTHER PUBLICATIONS

Kurt, Arda et al., "Hybrid-state driver/vehicle modeling, estimation and prediction", 13th International IEEE Annual Conference on Intelligent Transportation Systems, Sep. 2010, pp. 806-811, Paper TA3.4, Madeira Island, Portugal.
(Continued)

*Primary Examiner* — Spencer D Patton
(74) *Attorney, Agent, or Firm* — Young Basile Hanlon & MacFarlane, P.C.

(57) ABSTRACT

Operating a host vehicle is described as including identifying remote vehicle information indicating at least a geospatial state for a remote vehicle and identifying host vehicle information indicating at least a geospatial state for the host vehicle. For a sequence of sampling points, a distance between the remote vehicle and the host vehicle within a transportation network is determined based on the remote vehicle information and the host vehicle information, an angle from a centerline extending from the host vehicle for the distance is calculated, the angle varying as a function of the distance, and a conically-shaped zone is determined using the angle. Responsive to the remote vehicle being located within the conically-shaped zone, the host vehicle is operated based on the remote vehicle being in a lane in which the host vehicle is traveling. The host vehicle is behind the remote vehicle in a direction of travel. A method, vehicle, and apparatus are described.

20 Claims, 5 Drawing Sheets

(58) Field of Classification Search
CPC ....... B60W 2420/40; B60W 2420/403; B60W 2420/42; B60W 2420/54; B60W 2420/62; B60W 2550/308; B60W 2550/306; B60W 2550/30; B60W 2750/30; B60W 2750/306; B60W 2750/308; G01S 13/931; G01S 2013/9321; G01S 2013/9325
See application file for complete search history.

(56) References Cited

U.S. PATENT DOCUMENTS

| | | | |
|---|---|---|---|
| 6,008,741 | A | 12/1999 | Shinagawa et al. |
| 6,615,137 | B2 | 9/2003 | Lutter et al. |
| 6,700,504 | B1 | 3/2004 | Aslandogan et al. |
| 6,720,898 | B1 | 4/2004 | Ostrem |
| 6,791,471 | B2 | 9/2004 | Wehner et al. |
| 6,810,328 | B2 | 10/2004 | Yokota et al. |
| 8,000,897 | B2 | 8/2011 | Breed et al. |
| 8,175,796 | B1 | 5/2012 | Blackburn et al. |
| 8,229,663 | B2 | 7/2012 | Zeng et al. |
| 8,340,894 | B2 | 12/2012 | Yester |
| 8,466,807 | B2 | 6/2013 | Mudalige |
| 8,548,729 | B2 | 10/2013 | Mizuguchi |
| 8,577,550 | B2 | 11/2013 | Lu et al. |
| 8,587,418 | B2 | 11/2013 | Mochizuki et al. |
| 8,639,426 | B2 | 1/2014 | Dedes et al. |
| 8,717,192 | B2 | 5/2014 | Durekovic et al. |
| 8,798,841 | B1 | 8/2014 | Nickolaou et al. |
| 9,349,291 | B2 | 5/2016 | Goudy et al. |
| 2003/0067380 | A1 | 4/2003 | Bedi et al. |
| 2007/0109111 | A1 | 5/2007 | Breed et al. |
| 2007/0262881 | A1 | 11/2007 | Taylor |
| 2008/0167821 | A1 | 7/2008 | Breed |
| 2008/0266169 | A1* | 10/2008 | Akita ................... B60W 40/04 342/73 |
| 2009/0033540 | A1 | 2/2009 | Breed et al. |
| 2009/0140887 | A1 | 6/2009 | Breed et al. |
| 2009/0198412 | A1 | 8/2009 | Shiraki |
| 2010/0169009 | A1 | 7/2010 | Breed et al. |
| 2012/0016581 | A1 | 1/2012 | Mochizuki et al. |
| 2012/0176234 | A1* | 7/2012 | Taneyhill ........... B60K 31/0008 340/453 |
| 2012/0218093 | A1 | 8/2012 | Yoshizawa et al. |
| 2013/0099911 | A1 | 4/2013 | Mudalige et al. |
| 2013/0116915 | A1 | 5/2013 | Ferreira et al. |
| 2013/0179047 | A1 | 7/2013 | Miller et al. |
| 2013/0278440 | A1 | 10/2013 | Rubin et al. |
| 2014/0025285 | A1 | 1/2014 | Trombley |
| 2014/0145861 | A1 | 5/2014 | Goudy et al. |
| 2014/0148998 | A1 | 5/2014 | Goudy et al. |
| 2014/0148999 | A1 | 5/2014 | Goudy et al. |
| 2014/0149031 | A1 | 5/2014 | Goudy et al. |
| 2014/0200782 | A1 | 7/2014 | Goudy |
| 2014/0249718 | A1 | 9/2014 | Liu et al. |
| 2017/0031364 | A1 | 2/2017 | Takahashi et al. |
| 2017/0113683 | A1 | 4/2017 | Mudalige et al. |
| 2017/0221361 | A1 | 8/2017 | Goudy et al. |
| 2017/0221363 | A1 | 8/2017 | Goudy et al. |
| 2017/0278401 | A1 | 9/2017 | Probert et al. |

OTHER PUBLICATIONS

Kurt, Arda, "Hybrid-state system modeling for control, estimation and prediction in vehicular autonomy", presented in Partial Fulfillment of the Requirements for the Degree Doctor of Philosophy in the Graduate School of the Ohio State University, Mar. 2012, 136 pages, UMI/Proquest Pub. No. 3497707.

\* cited by examiner

OPERATION OF A VEHICLE BY CLASSIFYING A PRECEDING VEHICLE LANE

TECHNICAL FIELD

This disclosure relates to the field of vehicle warning systems, and in particular to operating a vehicle based on a location of a remote vehicle as being in the same lane or a different lane.

BACKGROUND

Computerization of certain aspects of vehicles has led to a shift from completely manual control of vehicles to vehicles in which drivers are provided with varying levels of assistance. Some systems are passive in nature. In a passive system, a condition is detected, and the driver is warned of the condition. Other systems are active in nature. In an active system, a condition is detected and the vehicle assumes control of a certain system or modifies the control inputs made by the driver.

Some driver assistance systems are intended to warn drivers as to potential collisions. Collision warning systems that are currently in wide use rely on detection and ranging systems that utilize technologies such as Sonar, Radar, and Lidar. The signals generated by the detection and ranging system are used as a basis for determining whether a collision is imminent.

Collision warning systems that are based on vehicle-to-vehicle (V2V) communications are under development. One example of V2V communication is a system in which vehicles exchange a basic safety message or "BSM." The BSM that is broadcast by a vehicle can contain a number of data elements that describe various aspects of the operation of the vehicle or provide information about the vehicle itself. As one example, the BSM can include location and trajectory information. As another example, the BSM can include information that describes the vehicle type and size for the vehicle. In any event, the BSM may be used in collision warning systems.

SUMMARY

Disclosed herein are vehicle warning and informative systems.

One aspect of the disclosure is a method for operating a host vehicle. The method includes identifying remote vehicle information indicating at least a geospatial state for a remote vehicle, identifying host vehicle information indicating at least a geospatial state for the host vehicle, and, for a sequence of sampling points, determining a distance between the remote vehicle and the host vehicle within a transportation network based on the remote vehicle information and the host vehicle information, the host vehicle behind the remote vehicle in a direction of travel, calculating an angle from a centerline extending from the host vehicle for the distance, the angle varying as a function of the distance, and determining a conically-shaped zone using the angle. The method also includes, responsive to the remote vehicle being located within the conically-shaped zone, operating the host vehicle based on the remote vehicle being in a lane in which the host vehicle is traveling.

Another aspect of the disclosure is a (e.g., host) vehicle that includes a powertrain, a sensor, and an operation system to operate the vehicle. The operation system is configured to identify remote vehicle information indicating at least a geospatial state for a remote vehicle and identify, using at least the sensor, host vehicle information indicating at least a geospatial state for the host vehicle. For a sequence of sampling points, a distance between the remote vehicle and the host vehicle within a transportation network is determined based on the remote vehicle information and the host vehicle information, the host vehicle behind the remote vehicle in a direction of travel, and an angle is calculated from a centerline extending from the host vehicle for the distance, the angle varying as a function of the distance. Responsive to the remote vehicle being located within a first conically-shaped zone determined by a first angle calculated at a first sampling point of the sequence, the host vehicle is operated based on the remote vehicle being in a lane in which the host vehicle is traveling. Responsive to calculating a second angle larger than the first angle at a second sampling point of the sequence, whether the remote vehicle remains in the lane in which the host vehicle is traveling is determined by determining whether the remote vehicle is located within a second conically-shaped zone determined by the second angle. Finally, and responsive to calculating a third angle smaller than the first angle at the second sampling point of the sequence, whether the remote vehicle remains in the lane in which the host vehicle is traveling is determined by determining whether the remote vehicle is located within the first conically-shaped zone determined by the first angle.

Another aspect of this disclosure is an apparatus for controlling a host vehicle. The apparatus includes a processor and memory storing instructions that cause the processor to perform a method comprising identifying remote vehicle information indicating at least a geospatial state for a remote vehicle, identifying host vehicle information indicating at least a geospatial state for the host vehicle, and, for a sequence of sampling points, determining a distance between the remote vehicle and the host vehicle within a transportation network based on the remote vehicle information and the host vehicle information, calculating an angle from a centerline extending from the host vehicle for the distance, the angle varying as a function of the distance, and determining a conically-shaped zone using the angle. The host vehicle is operated based on the remote vehicle being in a lane in which the host vehicle is traveling as long as the remote vehicle remains within the conically-shaped zone. The host vehicle is behind the remote vehicle in a direction of travel.

These and other aspects of the present disclosure are disclosed in the following detailed description of the embodiments, the appended claims, and the accompanying figures.

BRIEF DESCRIPTION OF THE DRAWINGS

The invention is best understood from the following detailed description when read in conjunction with the accompanying drawings. In the drawings, like numbers refer to like elements unless stated otherwise.

DETAILED DESCRIPTION

A vehicle warning system receives input over time from a variety of sources that detect one or more remote vehicles and determines whether there is a possibility of collision. The possibility of collision is based on, for example, the speed and heading of both a host vehicle with which the vehicle warning system is associated and one or more remote vehicles. If a remote vehicle and the host vehicle will each reach a converging point within a defined time absent a change in operation of either, an alert or warning will issue from the vehicle warning system. For example, an alert will issue if the vehicles will reach the converging point within two seconds, four seconds, or some other value, of each other. The terms alert and warning may be used interchangeably herein.

A remote vehicle may be heading in a same direction as the host vehicle. When that remote vehicle is in an adjacent lane, a converging point is unlikely unless there is a change in heading of either the remote vehicle or the host vehicle. When the remote vehicle is in the same lane as the host vehicle, however, differences in speed and/or acceleration alone can result in the determination of a converging point that may require an alert or other change to the operation of the host vehicle, remote vehicle, or both, to avoid a potential collision. Therefore, determining whether the remote vehicle and host vehicle are in the same lane is desirable.

In some cases, a host vehicle includes an adaptive cruise control (ACC) system including following control. Following control in the ACC system of a host vehicle may be used to set and maintain a constant distance from a remote vehicle that the host vehicle is behind in a travel lane. In this case, too, distinguishing whether a remote vehicle traveling in the same or substantially the same direction as the host vehicle is in the same lane or an adjacent lane to the host vehicle is desirable.

According to the teachings herein, a dynamic cone of relevance is used to determine the lane of a remote vehicle traveling ahead of a host vehicle so that the host vehicle can operate accordingly.

Figure 1:
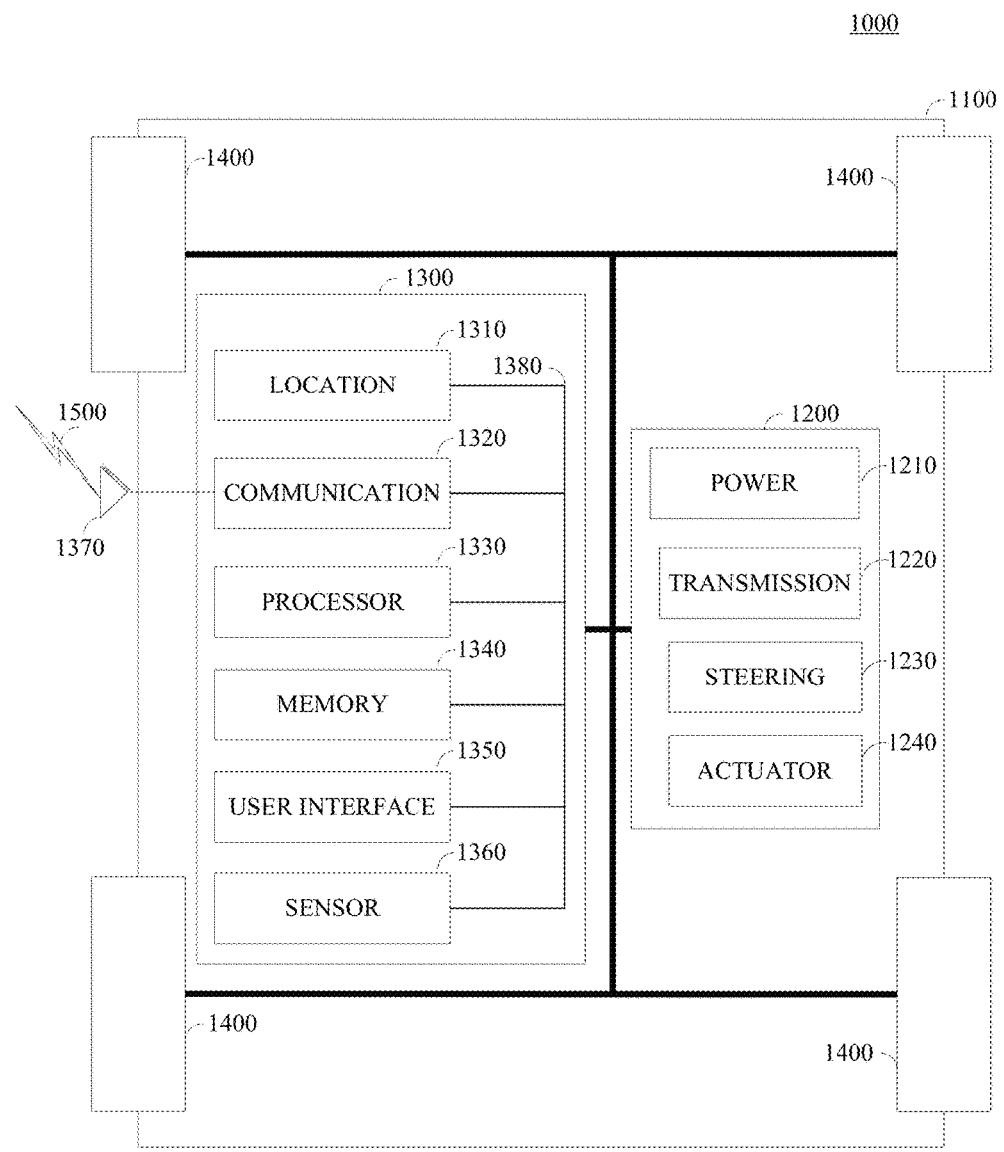
FIG. 1 is a diagram of an example of a vehicle in which the teachings herein may be incorporated.

FIG. 1 is a diagram of an example of a vehicle in which the aspects, features, and elements disclosed herein may be implemented. A vehicle 1000 includes a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400, or both, to control the vehicle 1000, which can include accelerating, decelerating, steering, or otherwise controlling the vehicle 1000.

The powertrain 1200 includes a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor is operatively coupled with the memory 1340 via a communication bus 1380.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via a wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single electronic communication unit 1320 and a single electronic communication interface 1370, any number of communication units and any number of communication interfaces may be used. In some embodiments, the electronic communication unit 1320 can include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensors 1360 can provide information regarding current operating characteristics of the vehicle. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 include sensors that are operable to obtain information regarding the physical environment surrounding the vehicle 1000. For example, one or more sensors detect road geometry and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, in some embodiments, the vehicle 1000 includes a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory includes control inputs such as a set of steering angles, with each steering angle corresponding to a point in time or a position. The optimized trajectory can be one or more paths, lines, curves, or a combination thereof.

One or more of the wheels 1400 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
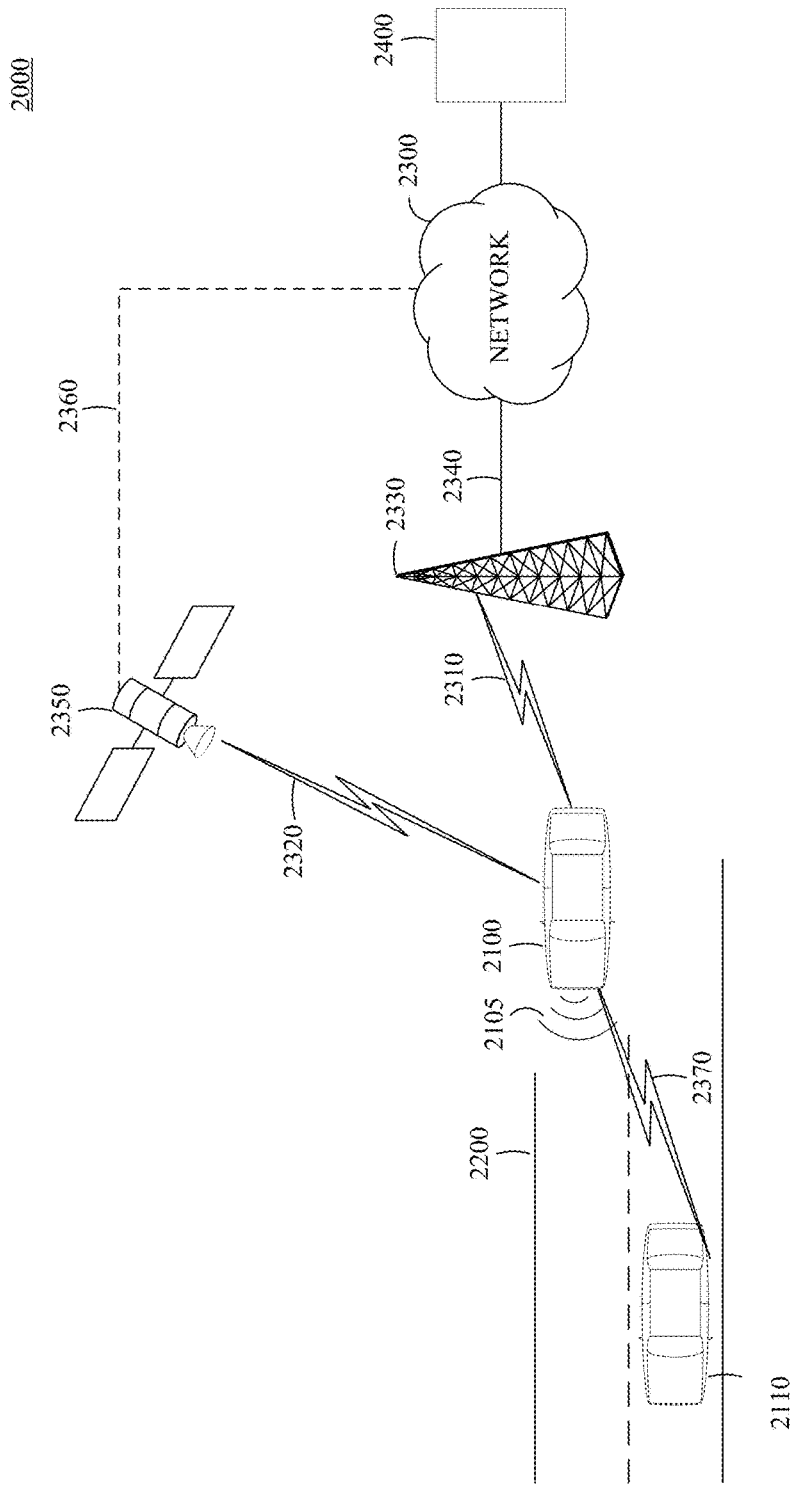
FIG. 2 is a diagram of an example of a portion of a vehicle transportation and communication system.

FIG. 2 is a diagram of an example of a portion of a vehicle transportation and communication system in which the aspects, features, and elements disclosed herein may be implemented. The vehicle transportation and communication system 2000 includes one or more vehicles 2100/2110, such as the vehicle 1000 shown in FIG. 1, which may travel via one or more portions of one or more transportation networks 2200, and may communicate via one or more electronic communication networks 2300. Although not explicitly shown in FIG. 2, a vehicle may traverse an area that is not expressly or completely included in a transportation network, such as an off-road area.

The electronic communication network 2300 may be a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the transportation network 2200, from a communication device 2400 via the electronic communication network 2300.

In some embodiments, a vehicle 2100/2110 communicates via a wired communication link (not shown), a wireless communication link 2310/2320/2370, or a combination of any number of wired or wireless communication links. For example, as shown, a vehicle 2100/2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. As shown for example, a host, or subject, vehicle 2100 receives one or more automated inter-vehicle messages, such as a basic safety message (BSM), from a remote, or target, vehicle 2110, via a direct communication link 2370, or via an electronic communication network 2300. The remote vehicle 2110 may broadcast the message to host vehicles within a defined broadcast range, such as 200 or 300 meters. In some embodiments, the host vehicle 2100 receives a message via a third party, such as a signal repeater (not shown) or another remote vehicle (not shown). A vehicle 2100/2110 may transmit one or more automated inter-vehicle messages periodically based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information (which may be transmitted as part of the kinematic state information) indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, can be configured to communicate with the vehicle 2100, with the electronic communication network 2300, with one or more communication devices 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. A satellite 2350, which may include a computing device, can be configured to communicate with a vehicle 2100, with the electronic communication network 2300, with one or more communication devices 2400, or with a combination thereof via one or more communication links 2320/2360. Although shown as a single unit, a satellite can include any number of interconnected elements.

An electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, a vehicle 2100 identifies a portion or condition of the transportation network 2200. For example, the vehicle may include one or more on-vehicle sensors 2105, such as sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

A vehicle 2100 may traverse a portion or portions of one or more transportation networks 2200 using information communicated via the electronic communication network 2300, such as information representing the transportation network 2200, information identified by one or more on-vehicle sensors 2105, or a combination thereof. The vehicle 2110 may be capable of all or only some of the communications and actions described above with respect to the vehicle 2100.

For simplicity, FIG. 2 shows the vehicle 2100 as the host vehicle, the vehicle 2110 as a remote vehicle, one transportation network 2200, one electronic communication network 2300, and one communication device 2400. However, any number of vehicles, networks, or computing devices may be used. In some embodiments, the vehicle transportation and communication system 2000 includes devices, units, or elements not shown in FIG. 2. Although each vehicle 2100/2110 is shown as a single unit, a vehicle can include any number of interconnected elements.

Although the vehicle 2100 is shown communicating with the communication device 2400 via the electronic communication network 2300, the vehicle 2100 (and vehicle 2110) may communicate with the communication device 2400 via any number of direct or indirect communication links. For example, the vehicle 2100/2110 may communicate with the communication device 2400 via a direct communication link, such as a Bluetooth communication link.

Within a (e.g., vehicle) transportation network, a host vehicle and a remote vehicle may be traveling along the same trajectory, i.e., in the same direction of travel. This is shown by example in FIG. 3, which is a diagram of a cone of relevance used determine whether a remote vehicle is in the same lane as a host vehicle within a transportation network 3000. In this example, the trajectories are determined based on automated inter-vehicle messages. However, this is not necessary—any source of the remote vehicle spatial and kinetic information and the host vehicle spatial and kinetic information may be used to determine the trajectories. The host vehicle is shown with stippling, and remote vehicle is shown in white. For simplicity and clarity, the diagram shown in FIG. 3 is oriented with north at the top and east at the right side.

Figure 3:
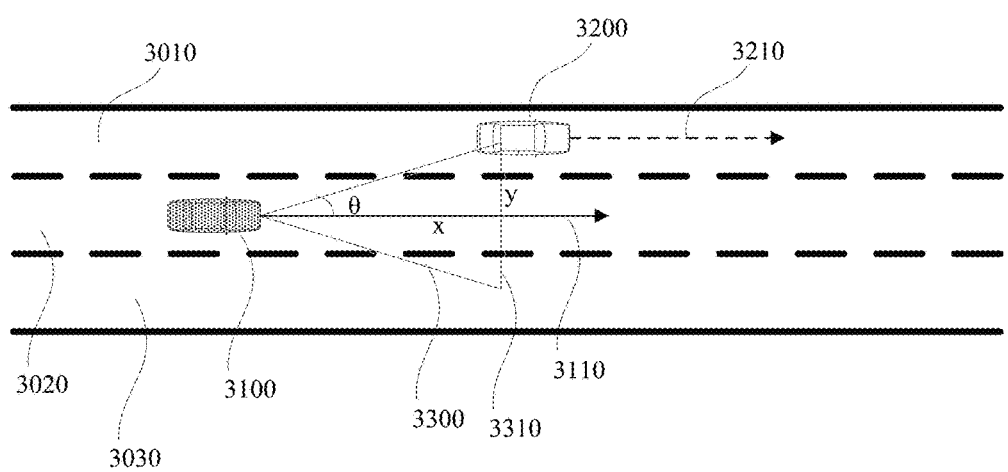
FIG. 3 is a diagram of a cone or conically-shaped zone of relevance used to determine whether a remote vehicle is in the same lane as a host vehicle.

As shown in FIG. 3, a host vehicle 3100 traverses a portion of the transportation network 3000. The transportation network 3000 includes a road having three traveling lanes, a first lane 3010, a second lane 3020, and a third lane 3030. The host vehicle 3100 is traveling within the second lane 3020 in a direction of travel indicated by the solid arrow 3110. Similarly, a remote vehicle 3200 is traveling within the first lane 3010 in a direction of travel by the dashed arrow 3210. The arrows 3110, 3210 are also referred to as the trajectories 3110, 3210 of the vehicles 3100, 3200. In the instant of time (i.e., the sampling point) shown in FIG. 3, the trajectories 3110, 3210 are in parallel. However, the trajectories 3110, 3210 do not have to be exactly the same and are likely not at different sampling points. To conclude that they have the same trajectory it is sufficient that they are proceeding in generally the same direction. The host vehicle 3100 is traveling behind the remote vehicle 3200 in direction of travel.

The trajectory 3110 for the host vehicle 3100 is based on host vehicle information, such as a geospatial state and a kinematic state of the host vehicle 3100. The trajectory 3210 for the remote vehicle 3210 may be based on automated inter-vehicle messages, which include remote vehicle information such as a geospatial state and a kinematic state for the remote vehicle 3200. For example, the remote vehicle messages transmitted by the remote vehicle 3200 in FIG. 3 indicate that the remote vehicle 3200 is heading west. The trajectory of a vehicle may be used to determine an expected path for a vehicle over time. How the expected path is determined from the trajectory is not particularly critical here. In one implementation, the heading and speed of a vehicle are used to project the position of the vehicle at certain points in the future, i.e., the expected path, such as at one second intervals.

As explained briefly above, a dynamic cone of relevance can be used to determine the lane of a remote vehicle traveling ahead of a host vehicle so that the host vehicle operates accordingly. FIG. 3 shows a static cone of relevance to illustrate the differences as compared to using a dynamic cone of relevance. More specifically, a static cone of relevance may be determined using a defined detection range x of the host vehicle 3100. In some cases, this is the defined broadcast range of a remote vehicle, such as the remote vehicle 3200. In this example, the defined detection range x is up to 200 meters, but other values are possible. The static cone of relevance may also be determined using a defined distance y perpendicular to the centerline of the host vehicle. The defined distance y may be based on expected lane widths, such as about 13-14 feet. For this reason, the defined distance y is generally between 1.85 and 2.05 meters. The static cone of relevance in FIG. 3 is a conically-shaped zone 3300 defined by using the defined detection range x and the defined distance y to generate the angle θ from the centerline 3110 of the host vehicle 3100. This triangular shape is then rotated 360 degrees to create the zone 3300. Note that the shape of the road, and hence the lanes 3010, 3020, 3030, including changes in grade and/or objects in the path of a curving road mean that the physical area monitored is most often not coincident with the conically-shaped zone 3300, nor is the physical area itself conical in most situations.

FIG. 3 illustrates a problem with a conically-shaped zone 3300 that is static. As can be seen, the conically-shaped zone 3300 has an outside end or range 3310 that extends outside of the second lane 3020 within which the host vehicle 3100 is traveling. In this case, the host vehicle 3100 can incorrectly conclude that the remote vehicle 3200 traveling in the same, second lane 3020 instead of traveling in the first lane 3010. This may cause the host vehicle 3100 to modify its operations inappropriately. For example, the host vehicle 3100 may slow if the remote vehicle 3200 slows, even though there is no risk of collision.

A dynamic cone of relevance or conically-shaped zone eliminates such false positives. Generally according to the teachings herein, inputs associated with a detected remote vehicle, including a distance between the remote vehicle and the host vehicle, are used to define the dynamic zone. The angle from a centerline that extends for the distance from the host vehicle varies as a function of the distance. This can be a step-wise function that allows the angle to stay relatively static for a range of distances from the host vehicle where the defined distance from the centerline (equivalent to the defined distance y) is constant. This suppresses a noisy signal over the sampling points and, at the same time, accounts for inaccuracies in GPS coordinates and differences in vehicle velocities. While eliminating false positives, however, the use of a step-wise function opens up the opportunity for oscillations between thresholds. To eliminate this, a further innovation implements a function that that holds the output (i.e., the conically-shaped zone) based on the largest calculated angle until sufficient data suggests using a smaller calculated angle to determine the conically-shaped zone. In any event, the determination that a remote vehicle is within the conically-shaped zone results in the host vehicle operating based on the remote vehicle being in a lane in which the host vehicle is traveling as discussed in more detail below.

There are a number of operational sequences that can be used to implement the host vehicle operation described above. One is shown by example in FIG. 4.

Figure 4:
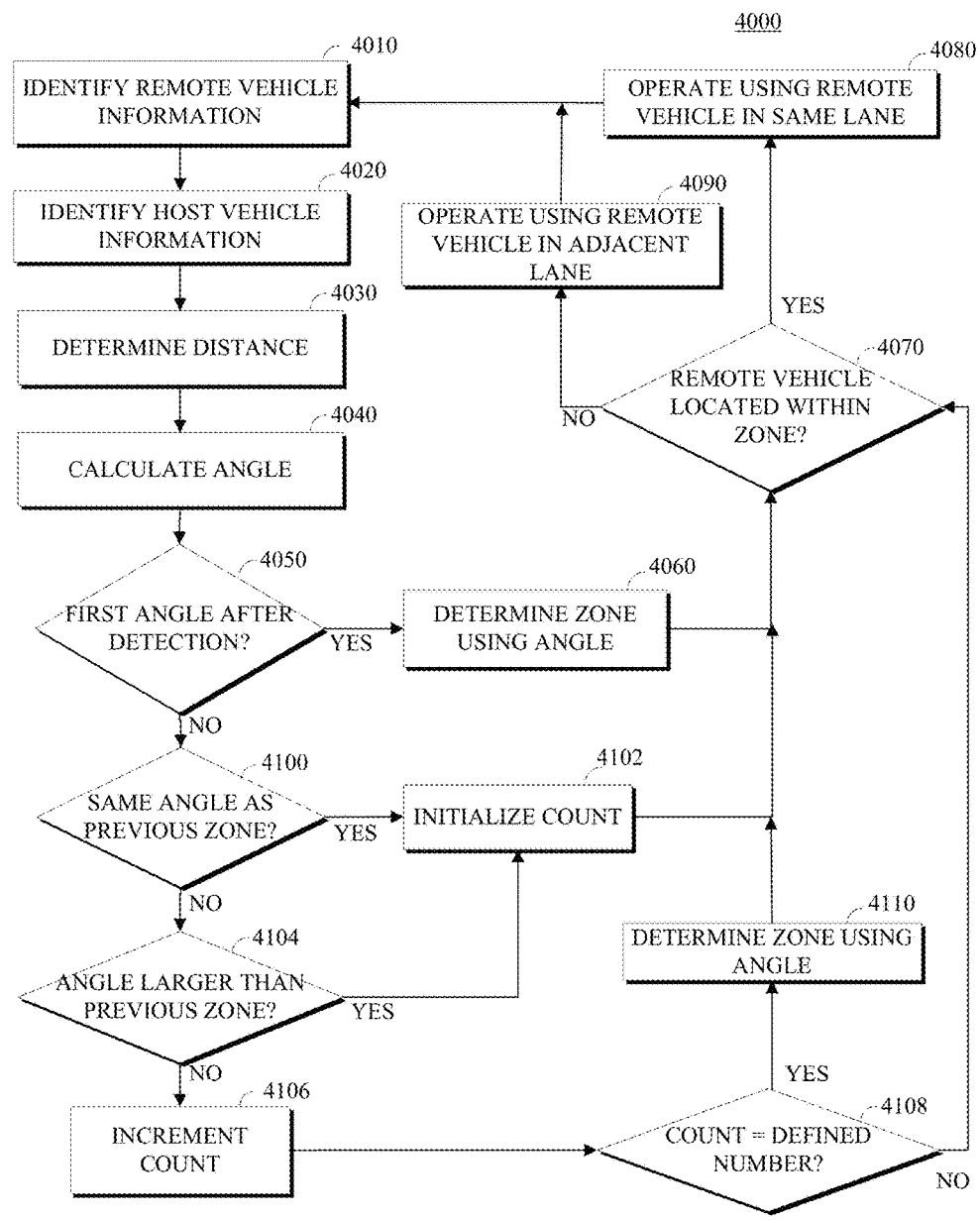
FIG. 4 is a flowchart of a method of operating a vehicle according to the teachings herein.

FIG. 4 is a flowchart of a method 4000 of operating a vehicle according to the teachings herein. The vehicle is also called a host vehicle herein. In some embodiments, the method 4000 is implemented in a vehicle, such as the vehicle 1000 shown in FIG. 1, the vehicles 2100, 2210 shown in FIG. 2, or the vehicles 3100, 3200 shown in FIG. 3. In other embodiments, the method is implemented in whole or in part external of the vehicle, such as within one or more processors of communication device 2400, with transmission of relevant information, such as remote vehicle information, to the host vehicle.

Either before or during the method 4000 of FIG. 4, transportation network information related to a transportation network in which the host vehicle is traveling is identified either by or for the host vehicle. The transportation network information may be identified from a storage device local to the host vehicle or may be transmitted from a source outside of the host vehicle. Transportation network information may represent one or more unnavigable areas, such as buildings, one or more partially navigable areas, such as a parking area, one or more navigable areas, such as roads, or a combination thereof. The transportation network information may also include one or more interchanges between one or more navigable, or partially navigable, areas. A road may include one or more lanes, and may be associated with one or more directions of travel. Lanes can be marked or unmarked.

Transportation network information may be expressed as a hierarchy of elements, such as markup language elements, which may be stored in a database or file. For simplicity, this disclosure depicts transportation network information representing portions of the transportation network as diagrams or maps; however, transportation network information may be expressed in any computer-usable form capable of representing a transportation network, or a portion thereof. In some embodiments, the transportation network information includes transportation network control information, such as direction of travel information, speed limit information, toll information, grade information, such as inclination or angle information, surface material information, aesthetic information, or a combination thereof.

Examples of information in a transportation network 3000 may be seen in FIG. 3 by example. As shown, the transportation network 3000 generally includes the lanes 3010, 3020, 3030 in which the host vehicle 3100 and one or more remote vehicles 3200 are traveling, as well as successor and predecessor lanes to the current lane and any adjacent lanes (also referred to as sibling lanes) that are within a defined geospatial range. The defined geospatial range may be a fixed value or may be variable based on the traveling speed of the host vehicle. As one example, the defined geospatial range is 300 meters.

Referring again to FIG. 3, remote vehicle information is identified at 4010. Herein, identify and its variations mean to obtain, receive, or otherwise identify the remote vehicle information. In some implementations, the host vehicle identifies the remote vehicle information at 4010 from a remote vehicle message sent by a remote vehicle, such as from the remote vehicle 3200 shown in FIG. 3, via a communication link, such as the wireless electronic communication link 2370 shown in FIG. 2. The information may be identified in whole or in part through dedicated short-range communications (DSRC) in V2V and vehicle-to-infrastructure (V2I) short-range wireless communications, for example. In other embodiments, the remote vehicle information is identified from signals received from the communication device 2400 through the electronic communication network 2300, including the satellite 2350 or the access point 2330. In some embodiments, the host vehicle stores the remote vehicle information. For example, the host vehicle stores the remote vehicle information in a memory of the host vehicle, such as the memory 1340 shown in FIG. 1. The remote vehicle information identified over time may be stored with timestamps.

Although one technique involves receiving remote vehicle information from a remote vehicle message sent by a remote vehicle, the particular technique of receiving the remote vehicle information is not so limited. That is, the remote vehicle information includes at least a geospatial state for the remote vehicle. In some embodiments, for example, the geospatial state includes geospatial coordinates for the remote vehicle, such as longitude and latitude coordinates that can be converted to map coordinates. The remote vehicle information may also include a kinematic state for the remote vehicle, which may include a remote vehicle velocity for the remote vehicle, a remote vehicle heading for the remote vehicle, a remote vehicle acceleration for the remote vehicle, or a remote vehicle yaw rate for the remote vehicle, or any other information, or combination of information, relevant to the operational state of the remote vehicle. As a result, identifying the remote vehicle information may be achieved by a variety of techniques that either provide the remote vehicle information directly or provide information from which the remote vehicle information may be determined.

For example, remote vehicle information may be identified from a location of an infrastructure device in the transportation network. Such infrastructure devices may include smart devices such as a traffic light, a road sensor, a road camera, or any other non-vehicle device associated with the transportation network and capable of detecting a vehicle. Remote vehicle information may also be received from a portable device while it is associated with a vehicle. For example, a portable device, such as a smartphone, carried by a passenger of the vehicle includes geographic location information, such as GPS or assisted GPS (AGPS) information and may include information associating the passenger with the vehicle.

The identification of remote vehicle information is not limited to any particular technique provided that the technique can associate the information with the particular remote vehicle. For example, SONAR, RADAR, and/or LIDAR mounted on the host vehicle, remote vehicle(s) or infrastructure device(s) may provide input that can be used to calculate or otherwise generate the remote vehicle information.

The host vehicle information identified at 4020 includes at least a geospatial state for the host vehicle, and may include a kinematic state for the host vehicle in some implementations. Like the remote vehicle information, the geospatial state for the host vehicle may include geospatial coordinates, such as longitude and latitude coordinates. In some embodiments, the kinematic state includes a host vehicle velocity for the host vehicle, a host vehicle heading for the host vehicle, a host vehicle acceleration for the host vehicle, or a host vehicle yaw rate for the host vehicle, or any other information, or combination of information, relevant to the operational state of the host vehicle. When the method 4000 is performed at the host vehicle, the host vehicle may use its on-board sensor information, such as from sensors 1360 and/or location device 1310 of FIG. 1, to identify the host vehicle information. Alternatively or additionally, host vehicle information may be identified from signals from the communication device 2400 or other devices such as those discussed with respect to the remote vehicle information.

Referring again to FIG. 4, a distance between the remote vehicle and the host vehicle within a transportation network is determined based on the remote vehicle information and the host vehicle information at 4030. The distance between the remote vehicle and the host vehicle may be determined, in particular, using the respective geospatial states of the vehicles. For example, where the geospatial states indicate the locations of the vehicles within a transportation network using GPS coordinates, those coordinates can be used to generate a geodesic whose length is the distance. In another example, where the geospatial states indicate the locations of the vehicles within a transportation network using two-dimensional map coordinates, the two sets of coordinates can be used to calculate a Euclidean distance.

In this discussion, it is assumed that the host vehicle is behind the remote vehicle in the direction of travel. However, some implementations may include a determination of the trajectories, such as trajectories 3110, 3210 of FIG. 3 using the remote vehicle information from 4010 and the host vehicle information from 4020 and, if necessary or desirable, a comparison of the relative positions of the two vehicles (as indicated by the geospatial states) within the transportation network. For example, if the trajectories have a difference in angle relative to an origin in two-dimensional space that is greater than a threshold value, it may be concluded that the host and remote vehicles are converging or diverging and that the host vehicle is not behind the remote vehicle in the direction of travel. If the trajectories are indicating a substantially similar direction of travel (e.g., as indicated by a small difference in angle), the geospatial states of each vehicle may be used to determine whether the host vehicle is behind the remote vehicle in the direction of travel. Under such conditions, the method 4000 can end without determining the distance at 4030 because there is no chance of concluding that the host vehicle is following the remote vehicle in the same lane. Other processing, such as that discussed below with respect to 4090, may instead occur.

At 4040, an angle is calculated from a centerline extending from the host vehicle for the distance determined at

4030. The angle varies as a function of the distance. More specifically, given a defined distance y from the centerline that does not change, the outside end or range 3310 (see FIG. 3) also remains unchanged. Hence, as the distance changes (instead of maintaining a constant defined detection range x as in FIG. 3), the angle θ changes to maintain the outside end or range 3310 at the value associated with a constant defined distance y (e.g., between 1.85 and 2.05 meters).

Use of a step-wise function to calculate the angle can desirably suppress a noisy signal over time while accounting for inaccuracies in GPS (and/or converted map) coordinates and differences in vehicle velocities. That is, the function used to generate the angle can be a step-wise function of the distance such that a range of values for the distance is associated with a single value for the angle. The step-wise function may be formed of a catenation of terms including the respective ranges of values for the distance. The respective ranges of values can be determined so as to maintain an outer range of the conically-shaped zone within a defined range of values based on a width of the lane in which the host vehicle is traveling. The goal is to allow for the angle from the centerline of the host vehicle to stay static for distances with similar angles to create a relatively clean output.

Stated generally, the catenation of terms can include a first term comprising a trigonometric function arctan(y/x) for a first range of values for the distance between zero and first distance value. Here, x is the distance and y is a distance from a centerline of the host vehicle in the direction of travel based on a width of the lane in which the host vehicle is traveling. The terms can also include a plurality of additional terms forming a step-wise function, each of the plurality of additional terms generating a respective single value for the angle for a respective range of values for the distance as inputs. One example of the step-wise function f(x) is derived from the trigonometric function N=arctan(2/x) where x is the distance and σ is a small constant to avoid division by zero as follows:

$$f(x) = \left(\frac{1*N}{4} * \left[\frac{x-0+\sigma}{|x-0|+\sigma} + 1\right] * \left[\frac{27-x-\sigma}{|27-x|+\sigma} + 1\right]\right) +$$
$$\left(\frac{1*4}{4} * \left[\frac{x-27+\sigma}{|x-27|+\sigma} + 1\right] * \left[\frac{30-x-\sigma}{|30-x|+\sigma} + 1\right]\right) +$$
$$\left(\frac{1*3.6}{4} * \left[\frac{x-30+\sigma}{|x-30|+\sigma} + 1\right] * \left[\frac{33-x-\sigma}{|33-x|+\sigma} + 1\right]\right) +$$
$$\left(\frac{1*3.3}{4} * \left[\frac{x-33+\sigma}{|x-33|+\sigma} + 1\right] * \left[\frac{36-x-\sigma}{|36-x|+\sigma} + 1\right]\right) +$$
$$\left(\frac{1*3}{4} * \left[\frac{x-36+\sigma}{|x-36|+\sigma} + 1\right] * \left[\frac{39-x-\sigma}{|39-x|+\sigma} + 1\right]\right) +$$
$$\left(\frac{1*2.8}{4} * \left[\frac{x-39+\sigma}{|x-39|+\sigma} + 1\right] * \left[\frac{43-x-\sigma}{|43-x|+\sigma} + 1\right]\right) +$$
$$\left(\frac{1*2.5}{4} * \left[\frac{x-43+\sigma}{|x-43|+\sigma} + 1\right] * \left[\frac{47-x-\sigma}{|47-x|+\sigma} + 1\right]\right) +$$
$$\left(\frac{1*2.3}{4} * \left[\frac{x-47+\sigma}{|x-47|+\sigma} + 1\right] * \left[\frac{51-x-\sigma}{|51-x|+\sigma} + 1\right]\right) +$$
$$\left(\frac{1*2.1}{4} * \left[\frac{x-51+\sigma}{|x-51|+\sigma} + 1\right] * \left[\frac{56-x-\sigma}{|56-x|+\sigma} + 1\right]\right) +$$
$$\left(\frac{1*1.9}{4} * \left[\frac{x-56+\sigma}{|x-56|+\sigma} + 1\right] * \left[\frac{60-x-\sigma}{|60-x|+\sigma} + 1\right]\right) +$$
$$\left(\frac{1*1.8}{4} * \left[\frac{x-60+\sigma}{|x-60|+\sigma} + 1\right] * \left[\frac{64-x-\sigma}{|64-x|+\sigma} + 1\right]\right) +$$
$$\left(\frac{1*1.7}{4} * \left[\frac{x-64+\sigma}{|x-64|+\sigma} + 1\right] * \left[\frac{67-x-\sigma}{|67-x|+\sigma} + 1\right]\right) +$$

-continued $$\left(\frac{1*1.6}{4} * \left[\frac{x-67+\sigma}{|x-67|+\sigma} + 1\right] * \left[\frac{72-x-\sigma}{|72-x|+\sigma} + 1\right]\right) +$$
$$\left(\frac{1*1.5}{4} * \left[\frac{x-72+\sigma}{|x-72|+\sigma} + 1\right] * \left[\frac{78-x-\sigma}{|78-x|+\sigma} + 1\right]\right) +$$
$$\left(\frac{1*1.4}{4} * \left[\frac{x-78+\sigma}{|x-78|+\sigma} + 1\right] * \left[\frac{83-x-\sigma}{|83-x|+\sigma} + 1\right]\right) +$$
$$\left(\frac{1*1.3}{4} * \left[\frac{x-83+\sigma}{|x-83|+\sigma} + 1\right] * \left[\frac{91-x-\sigma}{|91-x|+\sigma} + 1\right]\right) +$$
$$\left(\frac{1*1.2}{4} * \left[\frac{x-91+\sigma}{|x-91|+\sigma} + 1\right] * \left[\frac{98-x-\sigma}{|98-x|+\sigma} + 1\right]\right) +$$
$$\left(\frac{1*1.1}{4} * \left[\frac{x-98+\sigma}{|x-98|+\sigma} + 1\right] * \left[\frac{107-x-\sigma}{|107-x|+\sigma} + 1\right]\right) +$$
$$\left(\frac{1*1}{4} * \left[\frac{x-107+\sigma}{|x-107|+\sigma} + 1\right] * \left[\frac{117-x-\sigma}{|117-x|+\sigma} + 1\right]\right) +$$
$$\left(\frac{1*0.95}{4} * \left[\frac{x-117+\sigma}{|x-117|+\sigma} + 1\right] * \left[\frac{124-x-\sigma}{|124-x|+\sigma} + 1\right]\right) +$$
$$\left(\frac{1*0.9}{4} * \left[\frac{x-124+\sigma}{|x-124|+\sigma} + 1\right] * \left[\frac{130-x-\sigma}{|130-x|+\sigma} + 1\right]\right) +$$
$$\left(\frac{1*0.87}{4} * \left[\frac{x-130+\sigma}{|x-130|+\sigma} + 1\right] * \left[\frac{133-x-\sigma}{|133-x|+\sigma} + 1\right]\right) +$$
$$\left(\frac{1*0.85}{4} * \left[\frac{x-133+\sigma}{|x-133|+\sigma} + 1\right] * \left[\frac{137-x-\sigma}{|137-x|+\sigma} + 1\right]\right) +$$
$$\left(\frac{1*0.83}{4} * \left[\frac{x-137+\sigma}{|x-137|+\sigma} + 1\right] * \left[\frac{141-x-\sigma}{|141-x|+\sigma} + 1\right]\right) +$$
$$\left(\frac{1*0.8}{4} * \left[\frac{x-141+\sigma}{|x-141|+\sigma} + 1\right] * \left[\frac{146-x-\sigma}{|146-x|+\sigma} + 1\right]\right) +$$
$$\left(\frac{1*0.77}{4} * \left[\frac{x-146+\sigma}{|x-146|+\sigma} + 1\right] * \left[\frac{151-x-\sigma}{|151-x|+\sigma} + 1\right]\right) +$$
$$\left(\frac{1*0.75}{4} * \left[\frac{x-151+\sigma}{|x-151|+\sigma} + 1\right] * \left[\frac{156-x-\sigma}{|156-x|+\sigma} + 1\right]\right) +$$
$$\left(\frac{1*0.73}{4} * \left[\frac{x-156+\sigma}{|x-156|+\sigma} + 1\right] * \left[\frac{160-x-\sigma}{|160-x|+\sigma} + 1\right]\right) +$$
$$\left(\frac{1*0.7}{4} * \left[\frac{x-160+\sigma}{|x-160|+\sigma} + 1\right] * \left[\frac{167-x-\sigma}{|167-x|+\sigma} + 1\right]\right) +$$
$$\left(\frac{1*0.67}{4} * \left[\frac{x-167+\sigma}{|x-167|+\sigma} + 1\right] * \left[\frac{172-x-\sigma}{|172-x|+\sigma} + 1\right]\right) +$$
$$\left(\frac{1*0.65}{4} * \left[\frac{x-172+\sigma}{|x-172|+\sigma} + 1\right] * \left[\frac{179-x-\sigma}{|179-x|+\sigma} + 1\right]\right) +$$
$$\left(\frac{1*0.63}{4} * \left[\frac{x-179+\sigma}{|x-179|+\sigma} + 1\right] * \left[\frac{186-x-\sigma}{|186-x|+\sigma} + 1\right]\right) +$$
$$\left(\frac{1*0.6}{4} * \left[\frac{x-186+\sigma}{|x-186|+\sigma} + 1\right] * \left[\frac{195-x-\sigma}{|195-x|+\sigma} + 1\right]\right) +$$
$$\left(\frac{1*0.58}{4} * \left[\frac{x-195+\sigma}{|x-195|+\sigma} + 1\right] * \left[\frac{200-x-\sigma}{|200-x|+\sigma} + 1\right]\right)$$

This function is based on a possible range of values for x of 0-200 meters. Note that the terms are defined such that the terms are defined by ranges such that all terms except for the one within which the value of x lies results in a value of zero. For example, where the value of x is 196 meters, only the final term of the function is used to calculate the angle at 4040. It is also worth noting that one of the terms includes the trigonometric function arctan(2/x) for a first range of values between zero and first distance value. The value of 2 for y (see FIG. 3) is used in this trigonometric function to represent half of a four-meter lane width. Other functions would result from different values for y.

Figure 5:
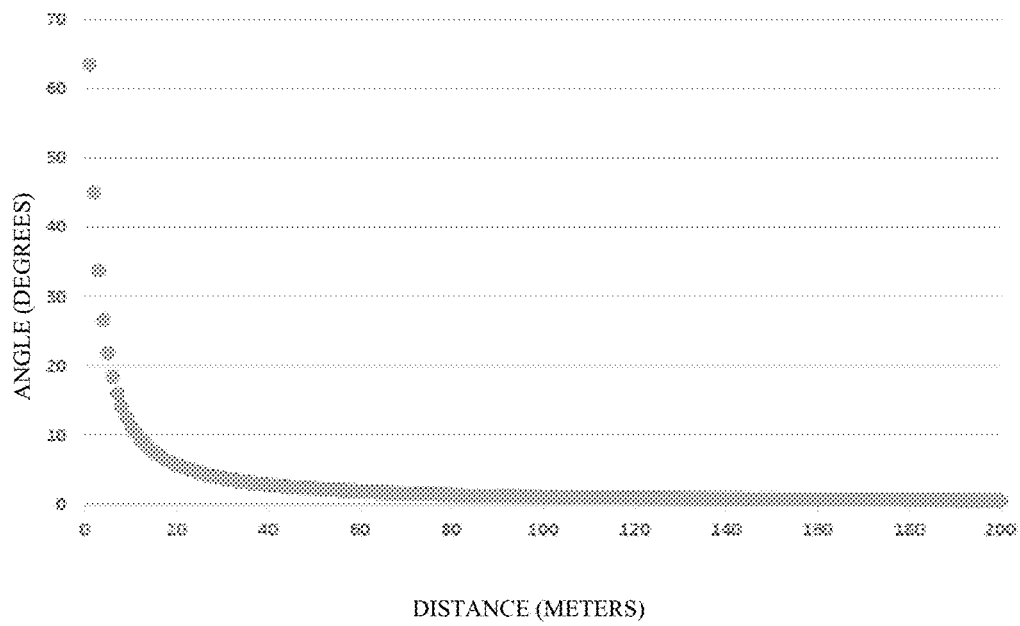
FIG. 5 is a graph of a trigonometric function used to calculate an output angle based on d a distance between the host vehicle and the remote vehicle.

The first distance value used on the first term of the step-wise function may be experimentally derived based on the shape of the trigonometric function. That is, different functions have different rates at which they fall or drop off as shown in FIG. 5. In this example where the trigonometric function is arctan(2/x), the angle is highest at close ranges and drops off steeply until about 27 meters. This steep slope makes it undesirable to group distances together with the same angle as with the following terms in the step-wise function due to a significant reduction in accuracy. Therefore, the example herein uses the trigonometric function for the first range up until x=27. The remaining terms are grouped into ranges of values for x, in this example, to maintain an outer edge of the conically-shaped zone with roughly the same radius (i.e., y is within a defined range of values about the value of 2 meters). In some cases, each range of values may be based on maintaining an outer range of the conically-shaped zone at a width wider than a width of the lane in which the host vehicle is traveling.

Referring again to FIG. 3, the method 4000 determines as 4050 whether the calculated angle is the first angle calculated after detection of the remote vehicle. This is useful for reducing possible oscillations between thresholds as discussed in more detail below. If the angle is the first calculation of an angle using the distance to a remote vehicle after detection of the remote vehicle at 4050, the method 4000 advances to determine the conically-shaped zone at 4060, e.g., by rotating the angle 360 degrees about the centerline as described with respect to FIG. 3. Then, a query determines whether the remote vehicle is within the conically-shaped zone at 4070. This determination can be made by using the remote vehicle information, for example, comparing an angle that is calculated between the centerline and a position of the remote vehicle and the angle used to determine the conically-shaped zone. If the angle between the centerline and a position of the remote vehicle is greater than the angle used to determine the conically-shaped zone, the remote vehicle is not located within the zone. Other geometric comparisons may be used to determine whether the remote vehicle is located within the conically-shaped zone at 4070.

Responsive to the remote vehicle being located within the conically-shaped zone at 4070, the host vehicle is operated at 4080 based on the remote vehicle being in a lane in which the host vehicle is traveling while proceeding to the next sampling point at 4010. This operation may encompass, for example, inputting a signal to a vehicle control system identifying the remote vehicle as being in the lane in which the host vehicle is traveling (e.g., following control or a vehicle warning system). In contrast, and responsive to the remote vehicle not being located within the conically-shaped zone at 4070, the method 4000 concludes that the remote vehicle is not in the lane in which the host vehicle is traveling. As optionally shown at 4090, this conclusion may result in the host vehicle being operated at 4090 based on the remote vehicle not being in a lane in which the host vehicle is traveling while proceeding to the next sampling point at 4010. This operation may encompass inputting a signal indicating this similarly to that described at 4080. Operation of the host vehicle may include alarms and/or actions performed automatically by signals from the processor of the host vehicle to one or more powertrain components, such as the processor 1330 of FIG. 1, either alone or in combination with actions by the operator.

Different system responses, and hence different operations, result when the remote vehicle is ahead of the host vehicle instead of being in an adjacent lane. For example, and referring to FIG. 3, a correct determination that the remote vehicle 3200 is in an adjacent lane may result in the host vehicle 3100 ignoring the slowing down of the remote vehicle 3200 without a change in trajectory, but may result in an alarm or other avoidance action if the remote vehicle information indicates a change of lane to the right of the travel direction (i.e., into the second lane 3020 from the first lane 3010). If instead the remote vehicle 3200 were in the second lane 3020 with the host vehicle 3100, the slowing may result in operating the host vehicle 3100 by generating a converging path for the remote vehicle 3200 and the host vehicle 3100 and transmitting a control signal to the powertrain of the host vehicle 3100 to take an avoidance action such as braking. However, the lane change would end or reduce the level of avoidance actions taken responsive to the slowing down of the remote vehicle 3200.

Referring again to FIG. 4, identifying the remote and host vehicle information, and hence determining the distance and calculating the angle are performed repeatedly, preferably on a periodic basis such as once every 100 ms, or more or less frequently. The repeated instances of the identification of remote and host vehicle information from which the distance and angle are determine may be referred to as sampling points. Some or all of the sampling points may form a sequence of sampling points.

In order to avoid oscillations of the zone used at 4070, the method 4000 can include processing by which the newly-calculated angle at 4040 is not always used to determine the conically-shaped zone. For example, when a first conically-shaped zone is determined using a first angle calculated using a first distance, the first angle may be used for determining the conically-shaped zone until one or more angles smaller than the first angle are calculated for a defined number of contiguous sampling points of the sequence. This is shown next in FIG. 4 starting at 3040.

At the next sampling point in the method 4000, the response to the query of 4050 is no. As a result, processing advances to determine whether the angle calculated at 4040 is the same angle as previously used to determine the conically-shaped zone using in the comparison at 4070. If so, a count is initialized (or re-initialized) at 4102. The count is to keep track of the number of contiguous sampling points after a conically-shaped zone is determined using a new angle where the angle calculated at 4040 is smaller than the angle used. Although not expressly shown, the count may also be initialized when the response to the query of 4050 is yes. The count may be implemented using a counter in certain implementations. After 4102, the conically-shaped zone may be determined again as described at 4060 as used in the query at 4070 to determine whether the remote vehicle is located within the conically-shaped zone, or the previously-determined conically-shaped zone may be used directly in the query at 4070 as in the implementation shown. In either case, the query at 4070 results in a conclusion of whether or not to operate the host vehicle assuming the remote vehicle is in the same lane. The method advances to 4080 or 4090 before the next sampling point occurs starting at 4010.

If the same angle as previously used to determine the conically-shaped zone is not calculated at 4040, the query of 4100 causes processing to advance to 4104, at which the determination is made as to whether the calculated angle from 4040 is larger than the angle previously used to determine the conically-shaped zone. If the calculated angle is larger at 4104, the larger angle is used to determine the conically-shaped zone at 4106. Determining the conically-shaped zone at 4106 is desirably done using the same technique as described with respect to 4060. Then, the count is initialized or re-initialized at 4102 before the method 4000 performs the comparison with the remote vehicle location at 4070 and advancing to 4080 or 4090, whichever is applicable. Processing then proceeds for the next sampling point starting at 4010.

If the angle calculated at 4040 is not the same as the angle previously used to determine the conically-shaped zone in response to the query at 4100, and is not larger than the angle previously used to determine the conically-shaped zone in response to the query at 4104, the count is incremented at 4108 before it is compared to the defined number of contiguous sampling points at 4110. If the defined number has not been reached at 4110, the conically-shaped zone may be determined again using the previous angle for use in the query at 4070 to determine whether the remote vehicle is located within the conically-shaped zone, or the previously-determined conically-shaped zone may be used directly in the query at 4070 as in the implementation shown. In either case, the query at 4070 results in a conclusion of whether or not to operate the host vehicle assuming the remote vehicle is in the same lane. The method advances to 4080 or 4090 before the next sampling point occurs starting at 4010.

In contrast, if the count is equal to (i.e., has reached) the defined number at 4110, the conically-shaped zone is determined at 4112. The conically-shaped zone may be determined as previously described with respect to 4060, but here the angle is lower than that previously used. In one example, and responsive to angles smaller than the previous angle being calculated for the defined number of contiguous sampling points of the sequence, a second angle is used to determine the conically-shaped zone that is the single output value of the step-wise function that is adjacent to and smaller than the previous angle. In some cases, the second angle used at 4112 is the calculated angle when the count reaches the defined number at 4110. In any event, the new zone is used in the determination of the remote vehicle lane at 4070 as described previous.

As mentioned, the defined number is used to hold the zone at a largest calculated angle until sufficient data suggests going to a smaller calculated. Using the step-wise function here as an example, a remote vehicle that has a distance of 159 meters from a host vehicle results in an angle of 0.73 degrees. Assuming the next sampling point shows that the remote vehicle has a distance of 160 meters from the remote vehicle, the angle is 0.7 degrees. The method 4000 hold the angle at 0.73 degrees until the count reaches k contiguous sampling points where the angle is less than 0.73. If the remote vehicle varies between 160 and 159 meters, the method 4000 holds the angle at 0.73 degrees because the count never reaches k. This reduces the need to constantly change angles used to determine the conically-shaped zone. If, for example, k contiguous sampling points are collected where the distance is 160 meters, the method 4000 can decrease the angle used to determine the conically-shaped zone to 0.7 degrees. By defaulting to the largest output angle, the method 4000 protects the host vehicle in the event of a sudden deceleration from the remote vehicle.

The method 4000 continues as long as the remote vehicle is detected (e.g., by the host vehicle) and the host vehicle is on and/or traveling. The defined number of contiguous sampling points in this example is ten (10) sampling points. Other numbers of sampling points may be used. In one example, more frequent sampling results in a larger count threshold, while less frequent sampling results in a smaller count threshold. Alternatively or additionally, the defined number is based on a speed of the host vehicle such that fewer points are considered as the speed of the host vehicle increases.

Variations in the teachings herein are possible. For example, and while the processing herein is described with respect to one vehicle, a remote vehicle may also have a similar system and is, in that case, a host vehicle in accordance with the teachings herein. Further, the processing describes the host vehicle as detecting a single vehicle and calculating a single conically-shaped zone. This is for simplicity. In actual practice, the method 4000 may be applied to conditions where multiple remote vehicles are detected. This is shown by example in FIG. 6, which is a diagram of a dynamic conically-shaped zone determined using the step-wise function described herein.

Figure 6:
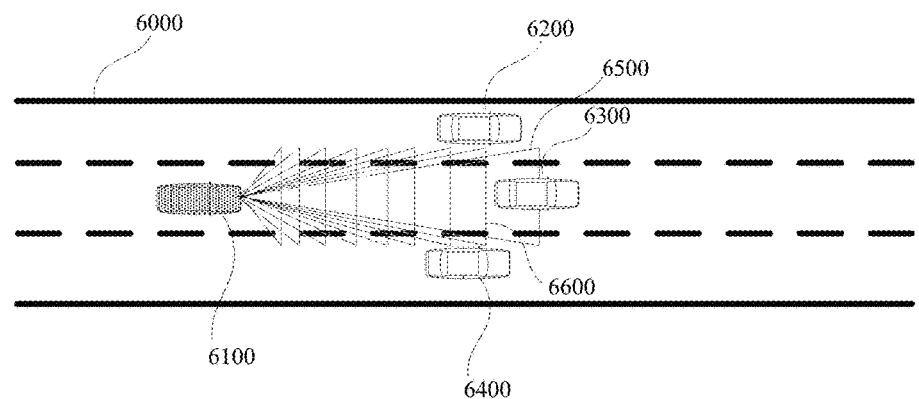
FIG. 6 is a diagram of a dynamic conically-shaped zone determined using the step-wise function described herein.

In FIG. 6, a host vehicle 6100 is traveling in the middle lane of a three-lane road and is performing the method 4000. Three remote vehicles 6200, 6300, 6400 are detected. A number of conically-shaped zones are shown for illustrative purposes, but only zones 6500 and 6600 are labeled. The remote vehicles 6200 and 6400 are closer to the host vehicle 6100 than the remote vehicle 6300. The distance of each from the host vehicle 6100 is such that a larger angle will result from the step-wise function than that used to determine the zone 6500. Assuming that the step-wise function results in a single angle for each of the remote vehicle distances, the zone 6600 represents the conically-shaped zone determined using that single angle. Neither of the remote vehicles 6200, 6400 is within the zone 6600, so the method 4000 concludes that these remote vehicles are not in the lane in which the host vehicle 6100 is traveling. In contrast, the remote vehicle 6300 is within the zone 6500 determined using an angle calculated using the remote vehicle information of the remote vehicle 6300. Accordingly, the method 4000 operates based on the conclusion that the remote vehicle 6300 is within the lane in which the host vehicle 6100 is traveling at 4080, and operates based on the conclusion that the remote vehicles 6200,6400 are within adjacent lanes to the lane in which the host vehicle 6100 is traveling at 4090.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for operating a host vehicle, comprising:
    identifying remote vehicle information indicating at least a geospatial state for a remote vehicle;
    identifying host vehicle information indicating at least a geospatial state for the host vehicle;
    for a sequence of sampling points:
        determining a distance between the remote vehicle and the host vehicle within a transportation network based on the remote vehicle information and the host vehicle information, the host vehicle behind the remote vehicle in a direction of travel;
        calculating an angle from a centerline extending from the host vehicle for the distance, the angle varying as a function of the distance; and
        determining a conically-shaped zone using the angle, wherein the conically-shaped zone diverges from the host vehicle; and
    responsive to the remote vehicle being located within the conically-shaped zone, operating the host vehicle based on the remote vehicle being in a lane in which the host vehicle is traveling.

2. The method of claim 1, wherein the function is a step-wise function of the distance such that a range of values for the distance is associated with a single value for the angle.

3. The method of claim 1, wherein the function comprises a step-wise function formed of a catenation of terms including respective ranges of values for the distance as inputs.

4. The method of claim 3, wherein the function further comprises a term including a trigonometric function arctan (2/x) for a first range of values between zero and a first distance value, wherein x is the distance.

5. The method of claim 3, wherein the respective ranges of values are determined so as to maintain an outer range of the conically-shaped zone within a defined range of values based on a width of the lane in which the host vehicle is traveling.

6. The method of claim 1, further comprising:
    responsive to the remote vehicle being located outside the conically-shaped zone, concluding that the remote vehicle is not in the lane in which the host vehicle is traveling.

7. The method of claim 1, further comprising:
    inputting a signal to a vehicle control system identifying the remote vehicle as being in the lane in which the host vehicle is traveling.

8. The method of claim 1, further comprising:
    responsive to determining a first conically-shaped zone using a first angle calculated using a first distance, using the first angle for determining the conically-shaped zone until one or more angles smaller than the first angle are calculated for a defined number of contiguous sampling points of the sequence.

9. The method of claim 8, wherein the function is a step-wise function of the distance such that a range of values for the distance has a single output value for the angle, the method further comprising:
    responsive to the one or more angles smaller than the first angle being calculated for the defined number of contiguous sampling points of the sequence, using a second angle to determine the conically-shaped zone, the second angle being the single output value of the step-wise function that is adjacent to and smaller than the first angle.

10. The method of claim 1, further comprising:
responsive to the remote vehicle being located within a first conically-shaped zone determined using a first angle calculated using a first distance, using a second angle calculated for a next sampling point in the sequence only if the second angle is larger than the first angle.

11. The method of claim 1, further comprising:
determining whether the remote vehicle is located within the conically-shaped zone using the remote vehicle information.

12. The method of claim 11, wherein determining whether the remote vehicle is located within the conically-shaped zone comprises comparing an angle between the centerline and a position of the remote vehicle and the angle used to determine the conically-shaped zone.

13. The method of claim 1, further comprising:
ending the sequence of sampling points responsive to the distance having a maximum value.

14. A host vehicle, comprising:
a powertrain;
a sensor; and
an operation system to operate the host vehicle, the operation system configured to:
identify remote vehicle information indicating at least a geospatial state for a remote vehicle;
identify, using at least the sensor, host vehicle information indicating at least a geospatial state for the host vehicle;
for a sequence of sampling points:
determine a distance between the remote vehicle and the host vehicle within a transportation network based on the remote vehicle information and the host vehicle information, the host vehicle behind the remote vehicle in a direction of travel; and
calculate an angle from a centerline extending from the host vehicle for the distance, the angle varying as a function of the distance;
responsive to the remote vehicle being located within a first conically-shaped zone determined by a first angle calculated at a first sampling point of the sequence, operate the host vehicle based on the remote vehicle being in a lane in which the host vehicle is traveling;
responsive to calculating a second angle larger than the first angle at a second sampling point of the sequence:
determine whether the remote vehicle remains in the lane in which the host vehicle is traveling by determining whether the remote vehicle is located within a second conically-shaped zone determined by the second angle; and
responsive to calculating a third angle smaller than the first angle at the second sampling point of the sequence:
determine whether the remote vehicle remains in the lane in which the host vehicle is traveling by determining whether the remote vehicle is located within the first conically-shaped zone determined by the first angle.

15. The vehicle of claim 14, wherein the operation system is configured to operate the host vehicle based on the remote vehicle being in the lane in which the host vehicle is traveling by generating a converging path for the remote vehicle and the host vehicle and transmitting a control signal to the powertrain.

16. The vehicle of claim 14, wherein the function is a step-wise function of the distance such that a range of values for the distance has a single output value for the angle.

17. An apparatus for controlling a host vehicle, comprising:
a processor; and
memory storing instructions that cause the processor to perform a method comprising:
identifying remote vehicle information indicating at least a geospatial state for a remote vehicle;
identifying host vehicle information indicating at least a geospatial state for the host vehicle;
for a sequence of sampling points:
determining a distance between the remote vehicle and the host vehicle within a transportation network based on the remote vehicle information and the host vehicle information, the host vehicle behind the remote vehicle in a direction of travel;
calculating an angle from a centerline extending from the host vehicle for the distance, the angle varying as a function of the distance; and
determining a conically-shaped zone using the angle, wherein the conically-shaped zone diverges from the host vehicle; and
operating the host vehicle based on the remote vehicle being in a lane in which the host vehicle is traveling as long as the remote vehicle remains within the conically-shaped zone.

18. The apparatus of claim 17, wherein the function comprises a catenation of terms including:
a first term comprising a trigonometric function arctan(y/x) for a first range of values for the distance between zero and a first distance value, wherein x is the distance and y is a distance from the centerline of the host vehicle in the direction of travel based on a width of the lane in which the host vehicle is traveling; and
a plurality of additional terms forming a step-wise function, each of the plurality of additional terms generating a respective single value for the angle for a respective range of values for the distance as inputs.

19. The apparatus of claim 18, wherein each range of values is based on maintaining an outer range of the conically-shaped zone at a width wider than a width of the lane in which the host vehicle is traveling.

20. The apparatus of claim 17, wherein the instructions cause the processor to perform a method further comprising:
responsive to the angle calculated for a current sampling point being greater than the angle used to determine the conically-shaped zone for a previous sampling point, using the angle calculated for the current sampling point for determining the conically-shaped zone used to determine whether the remote vehicle is in the lane in which the host vehicle is traveling; and
responsive to the angle calculated for a current sampling point being less than the angle used to determine the conically-shaped zone for a previous sampling point, using the conically-shaped zone for the previous sampling point to determine whether the remote vehicle is in the lane in which the host vehicle is traveling.

* * * * *